(12) United States Patent
Downs

(10) Patent No.: US 10,670,129 B2
(45) Date of Patent: Jun. 2, 2020

(54) CLUTCHED COMPONENT

(71) Applicant: AMERICAN AXLE & MANUFACTURING, INC., Detroit, MI (US)

(72) Inventor: James P. Downs, South Lyon, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 48 days.

(21) Appl. No.: 16/157,216

(22) Filed: Oct. 11, 2018

(65) Prior Publication Data

US 2019/0154128 A1   May 23, 2019

Related U.S. Application Data

(60) Provisional application No. 62/587,629, filed on Nov. 17, 2017.

(51) Int. Cl.
| | | |
|---|---|---|
| *F16H 48/24* | (2006.01) | |
| *B60G 21/055* | (2006.01) | |
| *F16D 27/118* | (2006.01) | |
| *F16D 11/16* | (2006.01) | |
| *F16H 48/08* | (2006.01) | |
| *F16D 11/00* | (2006.01) | |
| *F16H 48/34* | (2012.01) | |

(52) U.S. Cl.
CPC ........... *F16H 48/24* (2013.01); *B60G 21/055* (2013.01); *F16D 11/16* (2013.01); *F16D 27/118* (2013.01); *F16D 2011/002* (2013.01); *F16D 2011/008* (2013.01); *F16H 48/08* (2013.01); *F16H 2048/346* (2013.01)

(58) Field of Classification Search
CPC .... F16H 48/08; F16H 48/24; F16H 2048/346; B60G 21/055; F16D 11/16; F16D 27/118; F16D 2011/002; F16D 2011/008
USPC .......................................................... 475/231
See application file for complete search history.

(56) References Cited

U.S. PATENT DOCUMENTS

| | | | | |
|---|---|---|---|---|
| 2,038,986 | A * | 4/1936 | Browne | B60T 7/122 192/219.3 |
| 2,121,254 | A * | 6/1938 | Meinke | F16H 48/08 475/237 |
| 3,747,966 | A * | 7/1973 | Wilkes | F16D 1/116 403/322.2 |
| 5,251,926 | A * | 10/1993 | Aulerich | B60G 21/0553 267/188 |
| 6,428,019 | B1 * | 8/2002 | Kincad | B60G 21/0553 280/124.106 |
| 6,520,305 | B2 * | 2/2003 | Dick | F16D 11/10 192/108 |
| 6,637,757 | B2 * | 10/2003 | Ignatius | B60G 17/0185 280/124.106 |
| 7,832,739 | B2 * | 11/2010 | Pinkos | B60G 3/20 192/69.6 |
| 7,887,072 | B2 * | 2/2011 | Hauser | B60G 17/005 280/124.107 |
| 7,909,339 | B2 * | 3/2011 | Pinkos | B60G 3/20 192/69.9 |

(Continued)

*Primary Examiner* — Leslie A Nicholson, III
(74) *Attorney, Agent, or Firm* — Burris Law, PLLC

(57) ABSTRACT

A clutched component having a locking mechanism that employs a plurality of radially movable locking elements to selectively rotationally couple first and second coupling parts to one another. A sleeve is employed to control radial movement of the locking elements.

16 Claims, 6 Drawing Sheets

(56) References Cited

U.S. PATENT DOCUMENTS 10,012,300 B2 * 7/2018 Valente ................ F16H 48/24
2016/0033025 A1 2/2016 Valente et al.

* cited by examiner

CLUTCHED COMPONENT

CROSS-REFERENCE TO RELATED APPLICATIONS

This application claims the benefit of U.S. Provisional Application No. 62/587,629, filed on Nov. 17, 2017, the disclosure of which is incorporated by reference as if fully set forth in detail herein.

FIELD

The present disclosure relates to a clutched component.

BACKGROUND

This section provides background information related to the present disclosure which is not necessarily prior art.

Commonly assigned U.S. Pat. No. 10,012,300 discloses a clutched component that employs an axially translating sleeve to coordinate the radial translation of a plurality of locking elements to selectively couple the input and the output of the clutched component to permit the transmission of rotary power there between. While the clutched component is satisfactory for its intended use, improvements are possible that permit the clutched component to be more easily fabricated and assembled and/or to reduce lash in the clutched component.

SUMMARY

This section provides a general summary of the disclosure, and is not a comprehensive disclosure of its full scope or all of its features.

In one form, the present disclosure provides a locking differential assembly that includes a differential case, a first coupling part, a gearset, a second coupling part, a plurality of locking members and a sleeve. The differential case has an open end and is configured to rotate about an output axis. The first coupling part is assembled to the differential case to close the open end. The first coupling part defines a plurality of locking member apertures that are spaced circumferentially about the output axis. The gearset has first and second outputs that are rotatable relative to the differential case about the output axis. The second coupling part is coupled to the first output for rotation therewith. The second coupling part is received in the first coupling part and has a plurality of locking member recesses that are spaced circumferentially apart about the output axis. The locking members are received in the locking member apertures. The sleeve is slidably disposed on the first coupling part and is movable between a first position, in which the sleeve provides radial clearance about the first coupling part that permits the locking members to disengage from the second coupling part to permit relative rotation between the second coupling part and the first coupling part, and a second position in which the sleeve is engaged to the locking members and the locking members are received in the locking member recesses such to thereby rotatably couple the second coupling part with first coupling part.

In another form, the present disclosure provides a method for assembling a locking differential assembly. The method includes: providing a first output and a second coupling part; mounting the second coupling part into a first coupling part; inserting locking members through locking member apertures in the first coupling part and into locking member recesses in the second coupling part; installing a sleeve over the first coupling part to retain the locking members to the first coupling part; providing a differential case with an open end; installing a second output and a pair of differential pinions through the open end into the differential case; meshing the second output with the pair of differential pinions while abutting the first coupling part to the differential case; and securing the first coupling part to the differential case to close the open end.

In still another form, the present disclosure provides a disconnecting stabilizer bar assembly with first and second bar members, first and second coupling parts, first and second locking members, and first and second sleeves. The first and second bar members are rotatable about a stabilizer bar axis. The first coupling part is coupled to the first stabilizer bar member for rotation therewith about the stabilizer bar axis. The first coupling part defines a plurality of first locking member apertures, which are spaced circumferentially about the stabilizer bar axis, and a plurality of second locking member apertures that are spaced circumferentially about the stabilizer bar axis. Each of the second locking member apertures is disposed circumferentially between a pair of the first locking member apertures. The second coupling part is coupled to the second bar member for rotation therewith about the stabilizer bar axis. The second coupling part is received in the first coupling part and has a plurality of locking member recesses that are spaced circumferentially apart about the stabilizer bar axis. The first locking members are received in the first locking member apertures and are movable in a radial direction relative to the stabilizer bar axis into and out of a corresponding one of the locking member recesses. The second locking members are received in the second locking member apertures and are movable in the radial direction into an out of a corresponding one of the locking member recesses. The first sleeve is slidably disposed on the first coupling part and is movable between a first position, in which the first sleeve provides radial clearance about the first coupling part that permits the first locking members to move outwardly of the locking member recesses, and a second position in which the first locking members are received in the locking member recesses and the first sleeve, the first locking members and the second coupling part are engaged to one another. The second sleeve is slidably disposed on the first coupling part and is movable between a third position, in which the second sleeve provides radial clearance about the first coupling part that permits the second locking member to move outwardly of the locking member recesses, and a fourth position in which the second locking members are received in the locking member recesses and the second sleeve, the second locking members and the second coupling part are engaged to one another. Positioning the first sleeve in the first position and the second sleeve in the third position permits relative rotation between the first and second bar members. Positioning the first sleeve in the second position and the second sleeve in the fourth position inhibits relative rotation between the first and second bar members.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
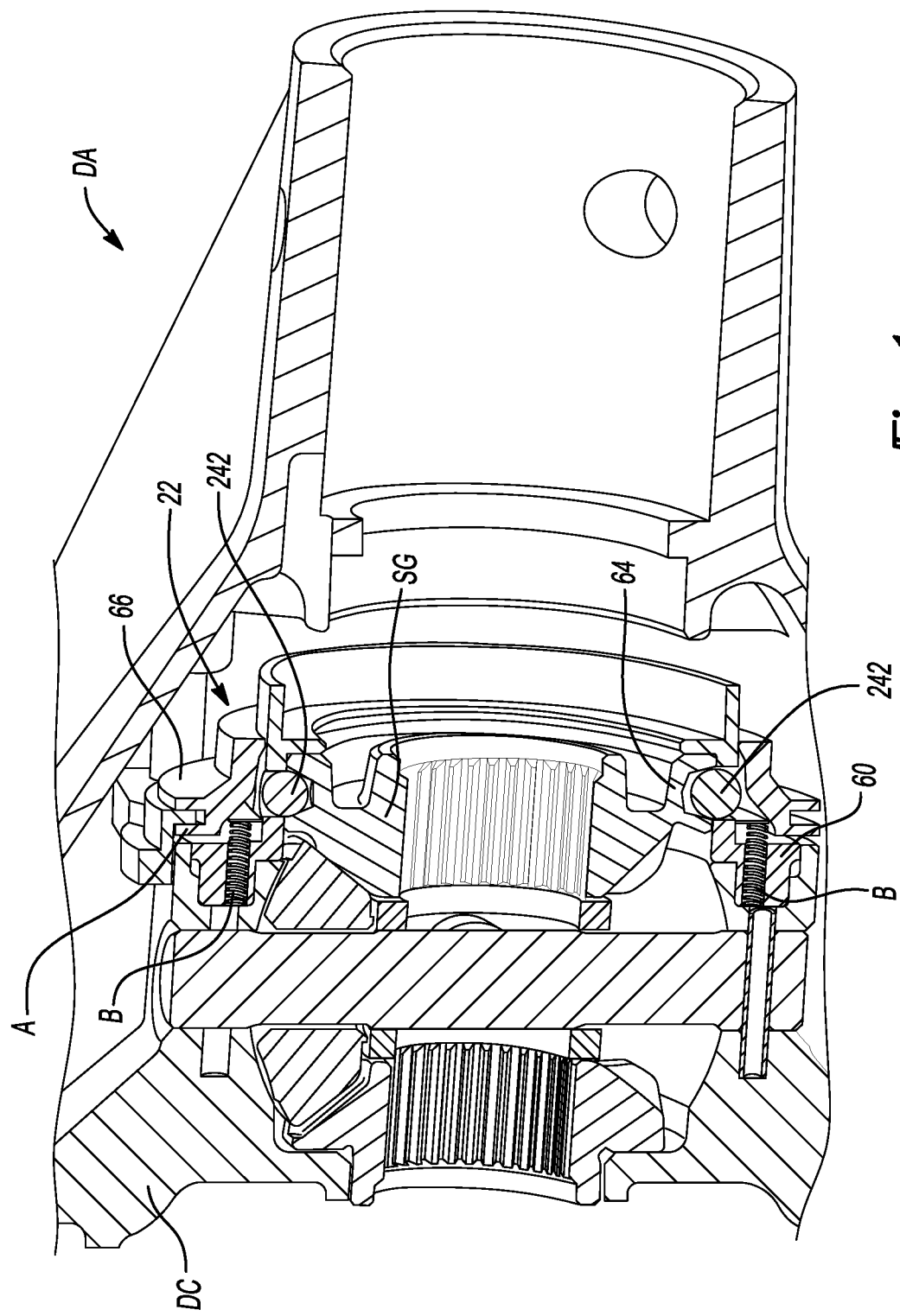
FIG. 1 is a perspective cross-sectional view of a first clutched component constructed in accordance with the teachings of the present disclosure.
Figure 2:
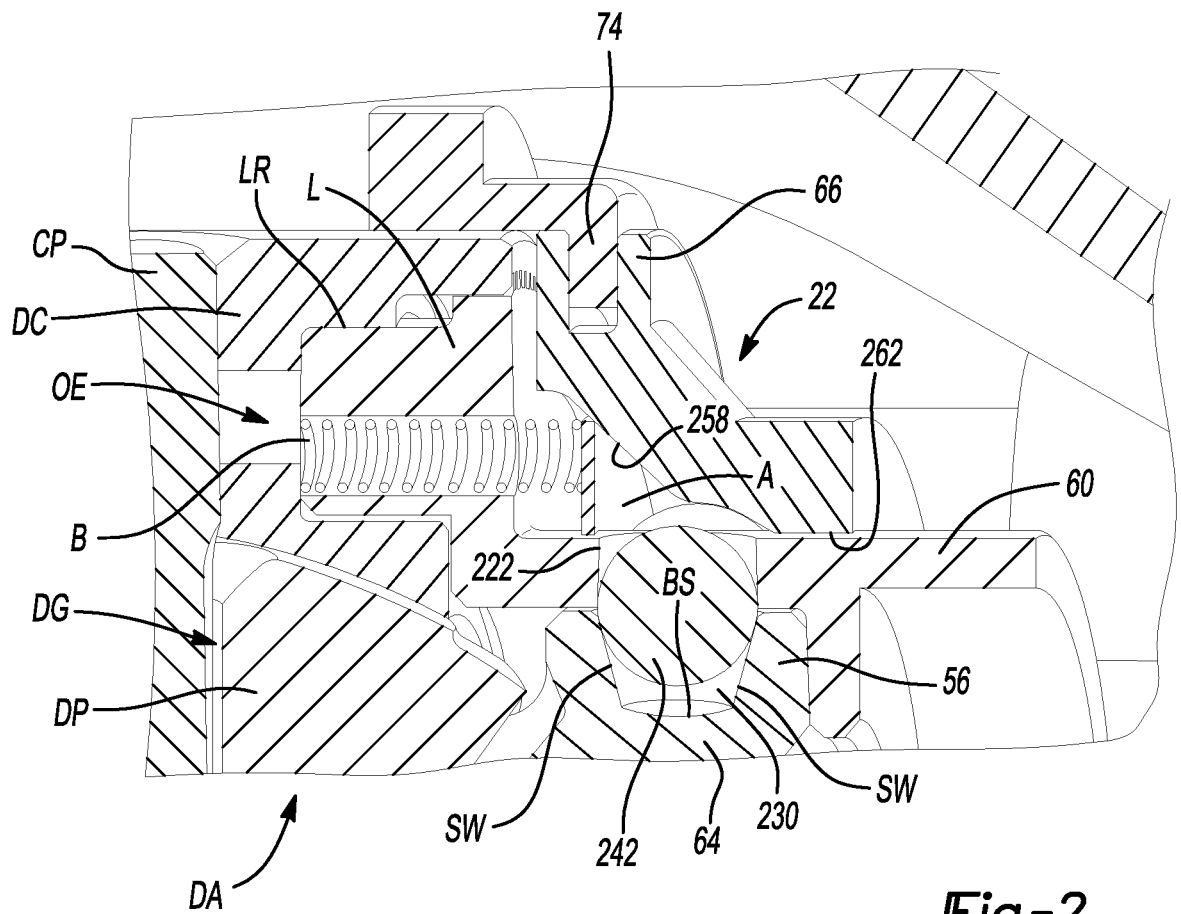
FIG. 2 is an enlarged portion of FIG. 1.
Figure 3:
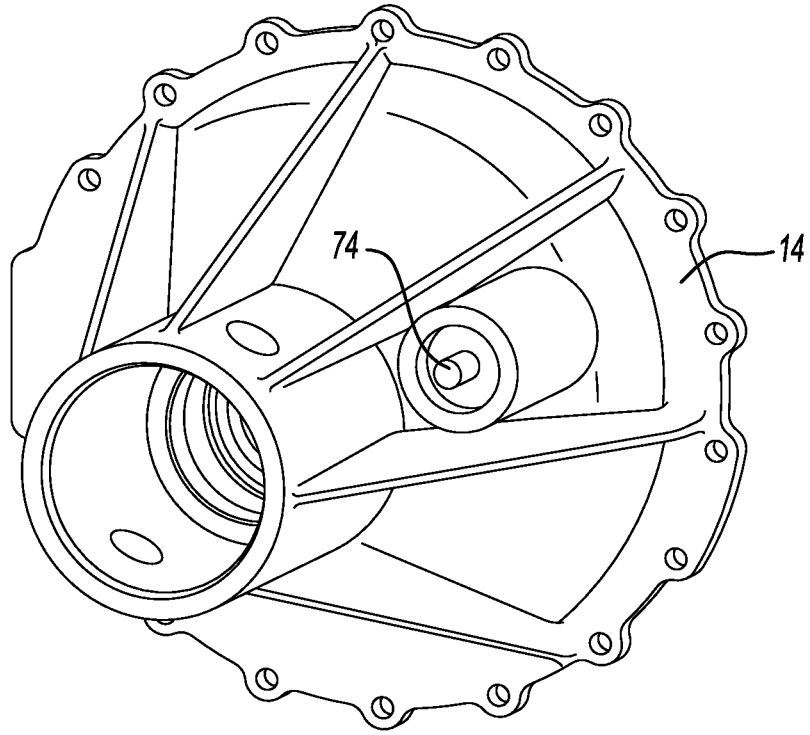
FIG. 3 is a perspective view of a portion of the clutched component of FIG. 1, illustrating an exterior housing in more detail.
Figure 4:
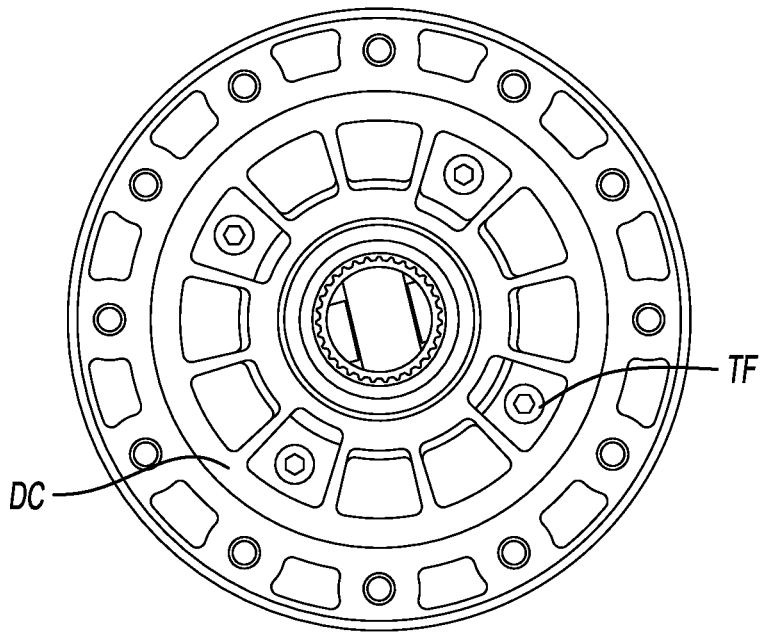
FIG. 4 is a side elevation view of a portion of the clutched component of FIG. 1.
Figure 5A:
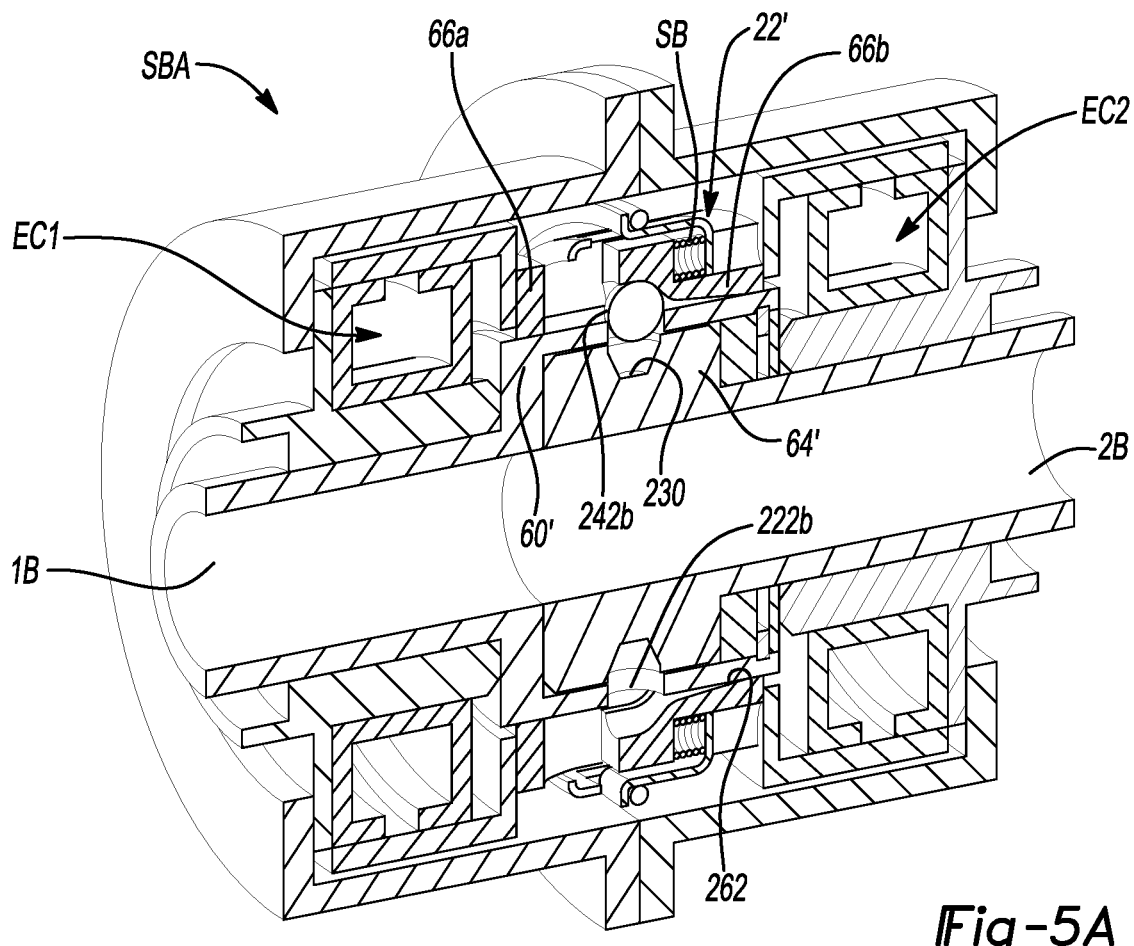
FIG. 5A is a perspective cross-sectional view of a second clutched component constructed in accordance with the teachings of the present disclosure.
Figure 5B:
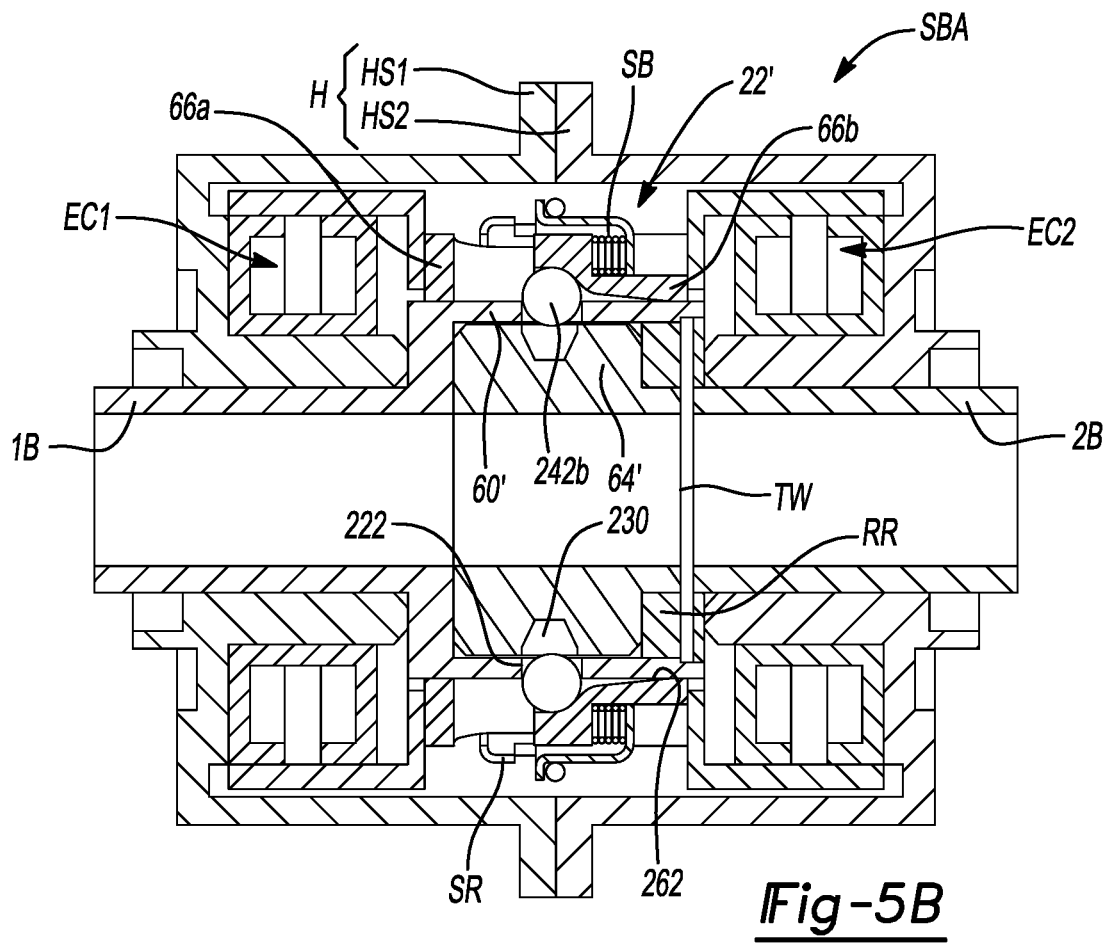
FIG. 5B is a longitudinal section view of the clutched component of FIG. 5A
Figure 6:
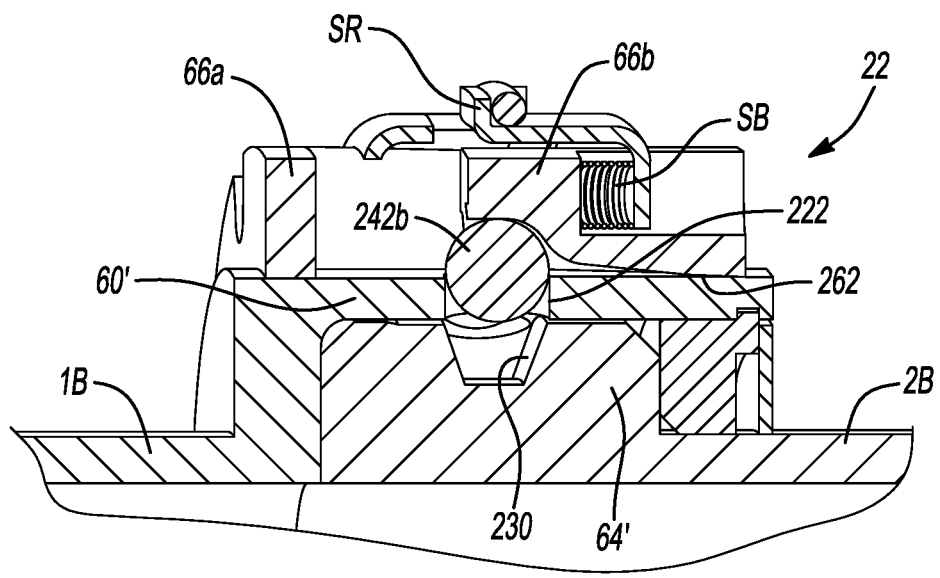
FIG. 6 is a perspective cross-sectional view of a portion of the clutched component of FIG. 5A.
Figure 7:
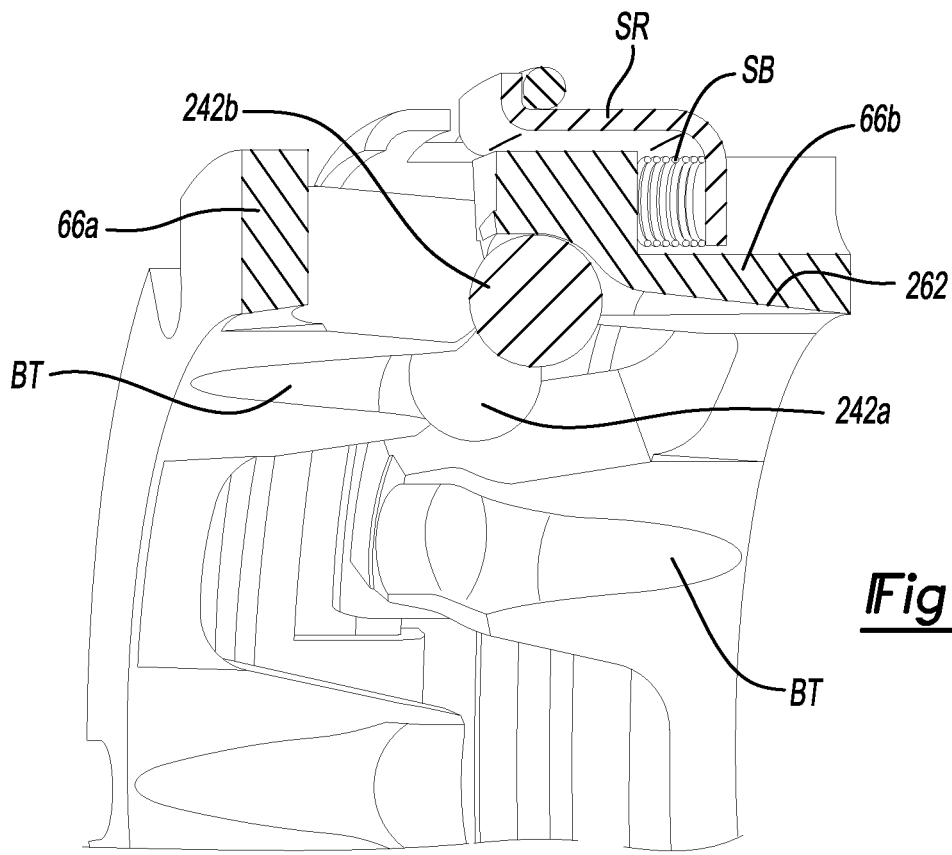
FIG. 7 is another perspective cross-sectional view of a portion of the clutched component of FIG. 5A.
Figure 8:
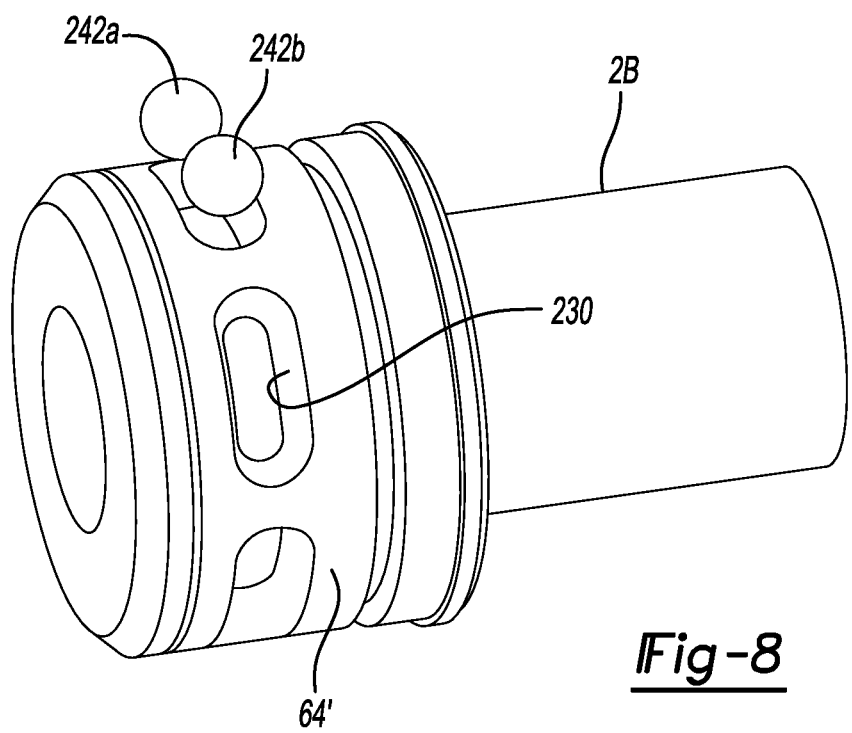
FIG. 8 is a perspective view of a portion of the clutched component of FIG. 5A.
Figure 9:
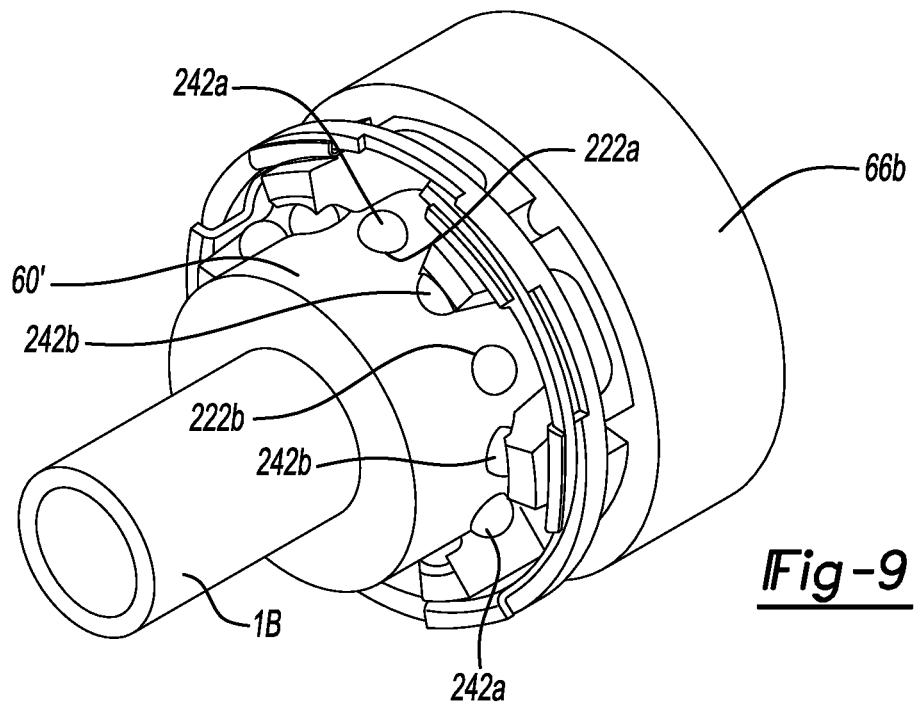
FIG. 9 is a perspective view of a portion of the clutched component of FIG. 5A.
Figure 10:
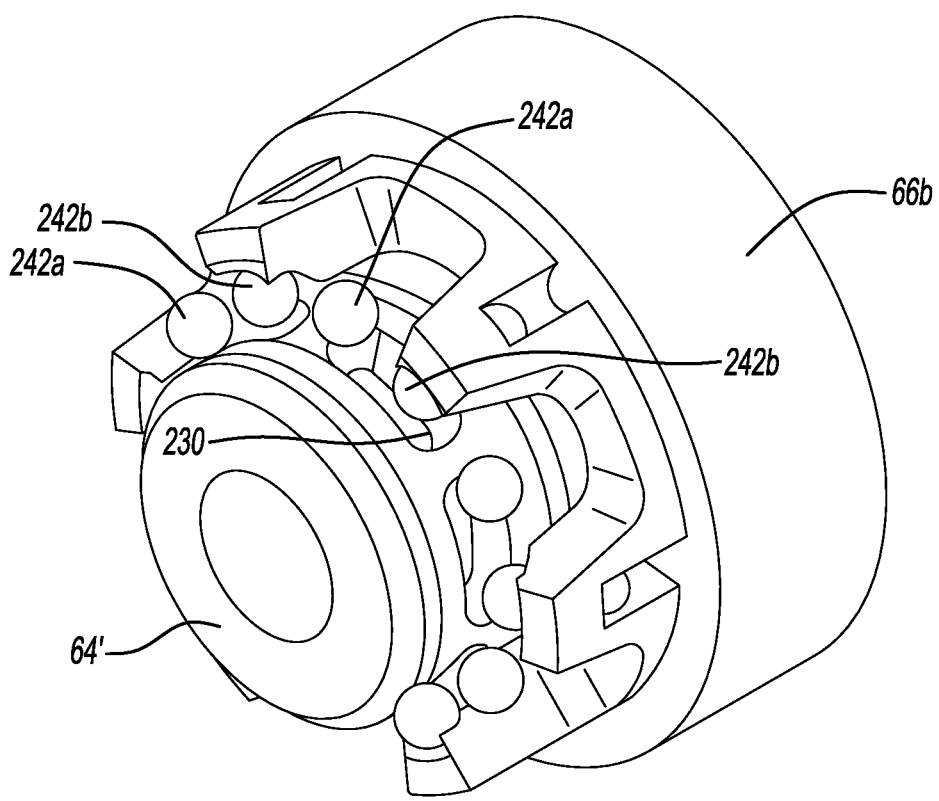
FIG. 10 is a portion of the perspective view of FIG. 9 with a first locking portion and a first bar removed therefrom.

The clutched component of FIGS. 1-4 can be generally similar to that which is described in detail in U.S. Patent Application Publication No. 2016/0033025 entitled "Clutched Component", the disclosure of which is incorporated by reference as if fully set forth in detail herein. In brief, the clutch or locking device 22 can include a first coupling part or locking portion 60, a second coupling part or locking portion 64, a sleeve 66, a plurality of locking elements 242, an annular apply plate A, and a plurality of springs B. Except as described herein, the first locking portion 60, the second locking portion 64, the sleeve 66 and the locking elements 242 can be constructed in a manner that is similar to that which is described in the above-referenced '3025 publication and as such, a detailed discussion of these components is not needed herein. Briefly and with specific reference to FIG. 2, the first locking portion 60 has a plurality of bores 222 that extend there through and into which the locking elements 242 are received. The sleeve 66 is movable on the first locking portion 60 (along the rotational axis of the first locking portion 60) to selectively move or sweep a cam surface 258 on the sleeve 66 across the locking elements 242. Movement of the cam surface 258 across the locking elements 242 drives the locking elements 242 in a radially inward direction where they can be received into recesses 230 in the second locking portion 64. Receipt of the locking elements 242 into the recesses 230 rotationally couples the first and second locking portions 60 and 64 to one another, as well as permits a sliding surface 262 formed on the sleeve 66 to engage the locking elements 242, which maintains the locking elements 242 in their radially inward position (i.e., received in the recesses 230 so as to engage the second locking portion 64). When the first and second locking portions 60 and 64 are to be de-coupled from one another (to permit relative rotation there between), the sleeve 66 can be moved along the first locking portion 60 to a position that permits the locking elements 242 to move radially outwardly from the second locking member 64 (e.g., due to centrifugal force applied to the locking elements 242 as the first locking portion 60 rotates). To facilitate movement of the sleeve 66, a shift fork 74 can be engaged to the sleeve 66 and can be moved via an actuator (not shown), that can be any type of linear motor. The shift fork 74 can extend through a housing H of the clutched component, as is shown in FIG. 3.

In the particular example provided, each of the recesses 230 in the second locking portion 64 has lateral sidewalls SW that taper outwardly from a bottom surface BS of the recess 230, the locking elements 242 comprise spherically-shaped balls, and the apply plate A and the springs B are employed to apply a force to the locking elements 242 that urges them into the recesses 230 in the second locking portion 64. The apply plate A and springs B urge the locking elements 242 into their radially inward position during the assembly of the clutched component, and moreover urge the locking elements 242 against the cam surface 258 when the clutch component is in use and the sleeve 66 is shifted axially on the first locking portion 60 into a position that permits the locking elements 242 to move to a radially outward position in which the locking elements 242 are disengaged from the second locking portion 64.

In the example of FIGS. 1-4, the clutched component is a differential assembly DA and the locking device 22 is selectively employed to rotationally couple a differential case DC to a side gear SG. In this example, the first locking portion 60 is a discrete component that is assembled to an open end OE of the differential case DC, while the second locking portion 64 is integrally formed with the side gear SG. Construction in this manner permits the remainder of a differential gearset DG (i.e., a second side gear (not shown), a cross-pin CP, which is mounted to the differential case DC, and a plurality of differential pinions DP that are rotatably mounted on the cross-pin CP and meshed with the second side gear) to be inserted into the open end OE and mounted to the differential case DC, as well as the locking device 22 to be assembled and then mounted to the differential case DC to engage the side gear SG to the differential pinions DP and close the open end of the differential case DC. The first locking portion 60 can be secured to the differential case DC via a plurality of threaded fasteners TF that are received through the first locking portion 60 and threadably engaged to the differential case DC.

Mating features can be formed into the first locking portion 60 and the differential case DC to inhibit relative rotation between the two components. For example, lugs L formed on the first locking portion 60 can be received into corresponding lug recesses LR formed in the differential case DC. Additionally, the lugs L can be sized, shaped and formed of a suitable material to broach the lug recesses LR when the first locking portion 60 is assembled to the differential case DC to thereby render the connection between the first locking portion 60 and the differential case DC "lash free" (i.e., the lugs L engage the lug recesses LR in a line-to-line manner). Construction in this manner is advantageous in that torsional loads associated with the transmission of rotary power between the differential case DC and the locking device 22 are transmitted from the radial walls bounding the lug recesses LR in the differential case DC to the lugs L on the first locking portion 60; this torsional load is not transmitted through the threaded fasteners TF that secure the first locking portion 60 to the differential case DC. Rather, the threaded fasteners TF resist only loads associated with the force on the side gear SG that tend to urge the side gear SG outwardly toward the first locking portion 60 as rotary power is transmitted through the differential assembly D.

From the foregoing, it will be appreciated that a method for assembling the locking differential assembly DA can include: providing the first output SG and the second coupling part 64; mounting the second coupling part 64 into the first coupling part 60; inserting locking members 242 through the locking member apertures 222 in the first coupling part 60 and into the locking member recesses 230 in the second coupling part 64; installing the sleeve 66 over the first coupling part 60 to retain the locking members 242 to the first coupling part 60; providing the differential case DC with an open end OE; installing a second output SG and a pair of differential pinions DP through the open end OE into the differential case DC; meshing the second output SG with the pair of differential pinions DP while abutting the first coupling part 60 to the differential case DC; and securing the first coupling part 60 to the differential case DC to close the open end OE.

With regard to FIGS. 5A-10, the locking device 22' could be employed in a stabilizer bar assembly SBA to selectively decouple a first bar 1B of the stabilizer bar assembly SBA from a second bar 2B of the stabilizer bar assembly SBA.

In this example, a first sleeve 66a is employed to control radial movement of a plurality of first locking elements 242a, a second sleeve 66b is employed to control radial movement of a plurality of second locking elements 242b, the first locking portion 60' is fixedly coupled to the first bar 1B of the stabilizer bar assembly SBA, and the second locking portion 64' is fixedly coupled to the second bar 2B of the stabilizer bar assembly SBA. The locking elements 242a and 242b, which comprise spherical balls, are employed in pairs to eliminate rotational lash from the locking device 22'. In this regard, pairs of the locking elements 242a and 242b are received into each of the first and second bores 222a and 222b in the first locking portion 60'. The sleeves 66a and 66b are movable to drive the first and second locking elements 242a and 242b, respectively, in a radially inward direction so that each pair of locking elements 242a and 242b is engaged within a recess 230 formed in the second locking portion 64'. Optionally, one or both of the sleeves 242a and 242b can be configured with ball tracks or races BT that can urge one or both of the locking elements 242a and 242b in a pair of locking elements away from one another as the sleeves 66a and 66b move toward one another to seat the locking elements 242a and 242b into the recesses 230. The relative circumferential motion between the locking elements 242a and 242b of each pair of the locking elements ensures that the locking elements 242a and 242b are engaged to the opposite circumferential ends of the recesses 230 to thereby eliminate lash in the locking mechanism 22'. If desired, a thrust washer TW and a retaining ring RR can be employed to limit axial movement of the second locking portion 64' relative to the first locking portion 60' In the example provided, the thrust washer TW is abutted against a side of the second locking portion 64' that is opposite the first locking portion 60' and the retaining ring RR, which is disposed on a side of the thrust washer TW opposite the second locking portion 64', is received in and secured to the first locking portion 60'.

Any suitable linear actuator can be employed to selectively move the sleeves 66a and 66b on the first locking portion 60'. In the example provided, a biasing spring SB urges the sleeves 66a and 66b along the first locking portion 60' toward one another to engage the locking elements 242a are disposed against the sliding surface 262 on the sleeve 66a and the locking elements 242b against the sliding surface 262 on the sleeve 66b, and a pair of electromagnetic coils EC1 and EC2 are employed to selectively generate a magnetic field that causes the sleeves 66a and 66b to slide along the first locking portion 60' in a direction away from one another to a point where the locking elements 242a and 242b can disengage the second locking portion 64'. A spring retainer SR can be disposed about the sleeves 66a and 66b. A first axial end of the spring retainer SR can be engaged to the sleeve 66a and the biasing springs SB can be disposed between the second, opposite axial end of the spring retainer SR and the second sleeve 66b. In the example provided, the biasing spring SB comprises a plurality of helical compression springs.

The locking mechanism 22', the biasing spring SB and the electromagnetic coils EC1 and EC2 can be housed in a housing H that is formed of two housing shells HS1 and HS2. The first bar 1B can be rotatably received in the housing shell HS1, while the second bar 2B can be rotatably received in the housing shell HS2. Optionally, one of the first and second bars 1B and 2B can be non-rotatably coupled to the housing H. It will be appreciated that the electromagnetic coils EC1 and EC2 can be non-rotatably coupled to the housing H. It will also be appreciated that one or both of the first and second bars 1B and 2B can comprise a coupling that is configured to be non-rotatably coupled to a generally L-shaped stabilizer bar member (not shown). For example, the each of the first and second bars 1B and 2B can have an internally splined aperture that is configured to axially slidably but non-rotatably engage a male splined segment (not shown) on an associated one of the generally L-shaped stabilizer bar members.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A locking differential assembly comprising:
a differential case having an open end, the differential case being adapted to rotate about an output axis;
a first coupling part assembled to the differential case to close the open end, the first coupling part defining a plurality of locking member apertures that are spaced circumferentially about the output axis;
a gearset having first and second outputs that are rotatable relative to the differential case about the output axis;
a second coupling part coupled to the first output for rotation therewith, the second coupling part received in the first coupling part and having a plurality of locking member recesses that are spaced circumferentially apart about the output axis;
a plurality of locking members received in the locking member apertures; and
a sleeve that is slidably disposed on the first coupling part, the sleeve being movable between a first position, in which the sleeve provides radial clearance about the first coupling part that permits the locking members to disengage from the second coupling part to permit relative rotation between the second coupling part and the first coupling part, and a second position in which the sleeve is engaged to the locking members and the locking members are received in the locking member recesses such to thereby rotatably couple the second coupling part with first coupling part.

2. The locking differential assembly of claim 1, further comprising a biasing spring that urges the sleeve toward one of the first and second positions.

3. The locking differential assembly of claim 2, wherein the biasing spring comprises a plurality of helical compression springs that are housed in the first coupling part.

4. The locking differential assembly of claim 1, wherein the locking members comprise spherical balls.

5. The locking differential assembly of claim 1, wherein the gearset further comprises a pair of differential pinions that are mounted on a cross-pin that is coupled to the differential case, the differential pinions being rotatably disposed on the cross-pin and meshingly engaged with the first and second outputs.

6. The locking differential assembly of claim 1, wherein the sleeve defines a groove and wherein a shift fork is received into the groove to axially but non-rotatably couple the shift fork to the sleeve, wherein movement of the shift fork along the output axis causes corresponding translation of the sleeve along the output axis.

7. The locking differential assembly of claim 6, further comprising a linear motor having a motor output that is coupled to shift fork.

8. The locking differential assembly of claim 7, wherein the linear motor is a solenoid.

9. The locking differential assembly of claim 1, wherein one of the differential case and the first coupling part includes a plurality of lugs, wherein the other one of the differential case and the first coupling part includes a plurality of lug recesses, and wherein the lugs engage the lug recesses in a line-to-line manner.

10. A disconnecting stabilizer bar assembly comprising:
a first bar member that is rotatable about a stabilizer bar axis;
a second bar member that is rotatable about the stabilizer bar axis;
a first coupling part coupled to the first bar member for rotation therewith about the stabilizer bar axis, the first coupling part defining a plurality of first locking member apertures, which are spaced circumferentially about the stabilizer bar axis, and a plurality of second locking member apertures that are spaced circumferentially about the stabilizer bar axis, each of the second locking member apertures being disposed circumferentially between a pair of the first locking member apertures;
a second coupling part coupled to the second bar member for rotation therewith about the stabilizer bar axis, the second coupling part received in the first coupling part and having a plurality of locking member recesses that are spaced circumferentially apart about the stabilizer bar axis;
a plurality of first locking members received in the first locking member apertures, each of the first locking members being movable in a radial direction relative to the stabilizer bar axis into and out of a corresponding one of the locking member recesses;
a pair of second locking members received in the second locking member apertures, each of the second locking members being movable in the radial direction into an out of a corresponding one of the locking member recesses;
a first sleeve that is slidably disposed on the first coupling part, the first sleeve being movable between a first position, in which the first sleeve provides radial clearance about the first coupling part that permits the first locking members to move outwardly of the locking member recesses, and a second position in which the first locking members are received in the locking member recesses and the first sleeve, the first locking members and the second coupling part are engaged to one another;
a second sleeve that is slidably disposed on the first coupling part, the second sleeve being movable between a third position, in which the second sleeve provides radial clearance about the first coupling part that permits the second locking members to move outwardly of the locking member recesses, and a fourth position in which the second locking members are received in the locking member recesses and the second sleeve, the second locking members and the second coupling part are engaged to one another;
wherein positioning the first sleeve in the first position and the second sleeve in the third position permits relative rotation between the first and second bar members, and wherein positioning the first sleeve in the second position and the second sleeve in the fourth position inhibits relative rotation between the first and second bar members.

11. The disconnecting stabilizer bar assembly of claim 10, further comprising a first biasing spring and a second biasing spring, the first biasing spring urging the first sleeve toward the second position, the second biasing spring urging the second sleeve toward the fourth position.

12. The disconnecting stabilizer bar assembly of claim 11, further comprising a spring retainer that is disposed about the first and second sleeves, wherein the first biasing spring comprises a plurality of first helical compression springs that are disposed between the spring retainer and the first sleeve, and wherein the second biasing spring comprises a plurality of second helical compression springs that are disposed between the spring retainer and the second sleeve.

13. The disconnecting stabilizer bar assembly of claim 10, wherein the first and second locking members comprise spherical balls.

14. The disconnecting stabilizer bar assembly of claim 10, wherein one of the first locking members and one of the second locking members is received into each of the locking member recesses when the first sleeve is in the second position and the second sleeve is in the fourth position.

15. The disconnecting stabilizer bar assembly of claim 14, wherein the second locking members are driven circumferentially apart from the first locking members when the second sleeve is moved from the third position to the fourth position.

16. The disconnecting stabilizer bar assembly of claim 10, further comprising first and second electromagnets, wherein the first electromagnet is selectively operable to generate a first magnetic field that is configured to move the first sleeve from the second position to the first position, and wherein the second electromagnet is selectively operable to generate a second magnetic field that is configured to move the second sleeve from the fourth position to the third position.

* * * * *